(No Model.)
J. B. FINCH.
SAW MILL DOG.
No. 259,516. Patented June 13, 1882.
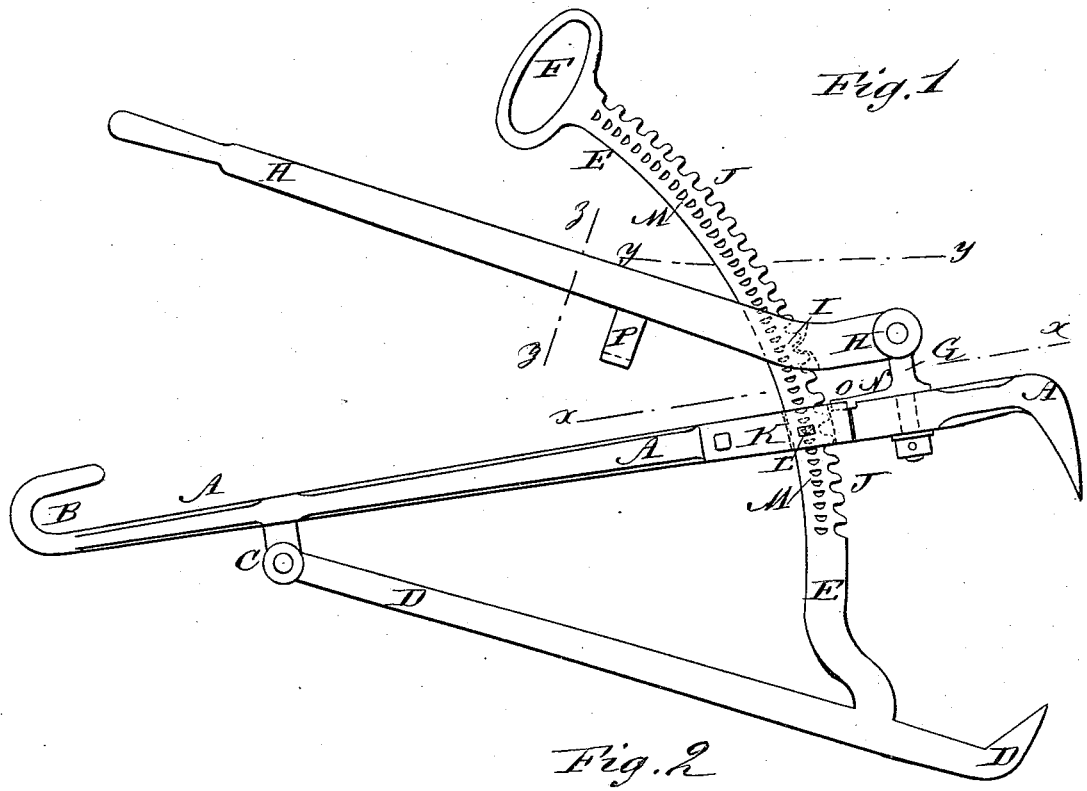
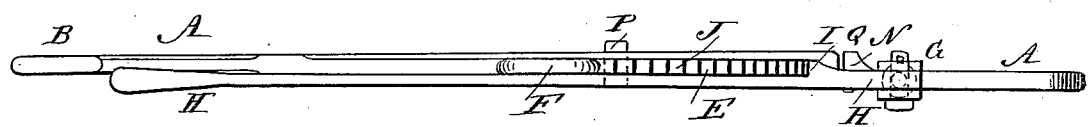
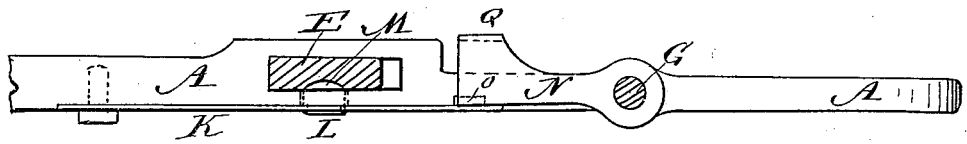
WITNESSES
C. Neveux
C. Sedgwick
INVENTOR:
J. B. Finch
BY Munn & Co
ATTORNEYS.

UNITED STATES PATENT OFFICE.

JAMES B. FINCH, OF BOZEMAN, MONTANA TERRITORY.

SAW-MILL DOG.

SPECIFICATION forming part of Letters Patent No. 259,516, dated June 13, 1882.

Application filed January 14, 1882. (No model.)

*To all whom it may concern:*

Be it known that I, JAMES B. FINCH, of Bozeman, in the county of Gallatin, Montana Territory, have invented a new and useful Improvement in Saw-Mill Dogs, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a plan view of the same. Fig. 3 is a sectional plan view of the same, taken through the line $x\,x$, Fig. 1. Fig. 4 is a sectional plan view of the same, taken through the line $y\,y$, Fig. 1. Fig. 5 is a sectional elevation of the lever, taken through the line $z\,z$, Fig. 1.

The object of this invention is to facilitate the dogging of logs upon saw-mill carriages.

The invention consists in a saw-mill dog constructed with two dogs hinged to each other, a curved rack-bar connecting the dogs, and a lever having teeth to engage with the teeth of the rack-bar for operating the dogs; also, in combination, with the upper dog, the curved rack-bar having teeth, and the lever having teeth, of a swiveled stud, whereby the said lever can be readily thrown into and out of gear with the said curved rack-bar; also, in the combination, with the upper dog and the curved rack-bar having ratchet-teeth, of a spring-pawl, whereby the two dogs are locked in place when applied to a log; also, in the combination, with the swiveled stud carrying the operating-lever and the spring-pawl, of the projecting arm having a side lip, whereby the spring-pawl can be thrown out of gear by the lateral movement of the operating-lever; also, in the combination, with the upper dog and the arm of the swiveled lever-carrying stud, of a side lip, whereby the lateral movement of the operating-lever is limited; and, also, in the combination, with the operating-lever and the upper dog, of the bent arm attached to the said lever, whereby the said lever can be locked out of gear with the said curved rack-bar, as will be hereinafter fully described.

A represents the upper dog, which has a hook or open eye, B, formed upon its rear end, by means of which it is hinged to the standard of the saw-mill carriage, in the manner of an ordinary dog.

To a lug, C, formed upon or attached to the rear part of the lower side of the upper dog, A, is hinged the rear end of the lower dog, D. Upon the forward ends of the dogs A D are formed jaws which project toward each other, as shown in Fig. 1. Upon the upper side of the forward part of the lower dog, D, is formed, or to it is attached, the lower end of an arm, E, which is curved upon the arc of a circle, passes up through a slot in the forward part of the upper dog, A, and has a handle, F, formed upon its upper end for convenience in handling the dog.

To the upper side of the upper dog, A, a little in front of the curved arm E, is swiveled a stud, G, to the upper end of which is hinged the forward end of a lever, H. The lever H crosses the side of the curved arm E, and extends back into such a position that it can be conveniently reached and operated by the sawyer to set and release the dog.

Upon the side of the lever H is formed a shoulder provided with teeth I to engage with the teeth J, formed upon the convex edge of the curved arm E, and serve as a fulcrum in operating the lever H. With this construction, by raising the rear end of the lever H the dogs A D will be forced toward each other and into the log, and by pressing the rear end of the lever H downward the dogs A D will be forced apart and withdrawn from the log to allow the log to be again set.

To the side of the upper dog, A, a little in the rear of the curved arm E, is attached the rear end of a spring, K, which extends along the side of the dog A to a point a little in front of the arm E.

To the side of the spring K is attached a point, L, which passes through a hole in the side of the upper dog, A, and engages with ratchet-teeth M, formed upon the side of the curved arm E, to lock the dogs in place when holding a log, the said point L sliding over the teeth M when the dogs A D are forced toward each other.

To the stud G is attached, or upon it is formed, an arm, N, which projects along the upper side of the dog A nearly to the curved arm E, and has a downwardly-projecting lip, O, formed upon the side of its rear end. The lip O rests in a recess in the side of the dog A, beneath the free end of the spring-pawl K, so that by moving the lever H a little to one side the point L of the said spring-pawl K will be withdrawn from the ratchet-teeth M and the free end of the lever H can be pressed downward to force the dogs A D apart and withdraw them from the log. By moving the lever H farther to one side the teeth I will be thrown out of gear with the teeth J, and the dogs A D will be free to move toward or from each other.

Upon the lever H, a little in the rear of the curved arm E, is formed an arm, P, which projects downward and is bent to one side, as shown in Fig. 5, so that when the lever H has been moved to one side far enough to throw the teeth I J out of gear and has been moved downward to the upper dog, A, the said arm P will rest against the side of the said dog A and lock the teeth I J out of gear, allowing the dogs A D to be moved toward and from each other freely, so that the dogs can be readily adjusted to the log.

The lever H is kept from being moved too far to one side by a lip, Q, formed upon the side of the free end of the arm N opposite the lip O.

Having thus described my invention, I claim as new and desire to secure by Letters Patent—

1. An improved saw-mill dog consisting of two dogs hinged together, a curved rack-bar attached to one dog and passing through the other, and pivoted lever provided with teeth engaging with the teeth of the said rack-bar, substantially as herein shown and described.

2. In a saw-mill dog, the combination, with the upper dog, A, and the rack-bar E, attached to the lower dog and passing through a slot in the said upper dog, of the lever H, provided with the teeth I, and pivoted to the swiveled stud G on the said upper dog, substantially as and for the purpose set forth.

3. In a saw-mill dog, the combination, with the upper dog, A, and the curved rack-bar E, provided with teeth M on its side, of the spring-pawl K L, secured to the side of the said upper dog and engaging the side teeth of the said rack-bar, substantially as and for the purpose set forth.

4. In a saw-mill dog, the combination, with the swiveled stud G, carrying the lever H, and the spring-pawl K L, of the arm N, having lip O, substantially as herein shown and described, whereby the spring-pawl can be thrown out of gear by the lateral movement of the operating-lever, as set forth.

5. In a saw-mill dog, the combination, with the upper dog, A, and the arm N of the swiveled stud G, of the lip Q, substantially as herein shown and described, whereby the lateral movement of the operating-lever is limited, as set forth.

6. In a saw-mill dog, the combination, with the upper dog, A, and the rack E, provided with the teeth J, of the lever H, swiveled to the said dog, and provided with the teeth I and the downwardly-projecting bent arm P, substantially as herein shown and described, whereby the lever can be locked out of gear with rack-bar, as set forth.

JAMES BOON FINCH.

Witnesses:
JAMES T. GRAHAM,
C. SEDGWICK.